United States Patent [19]

Caspar et al.

[11] 4,193,812
[45] Mar. 18, 1980

[54] PLASTER OBTAINED FROM PHOSPHOGYPSUM AND ITS PROCESS OF OBTENTION

[75] Inventors: Jean-Pierre Caspar, Le Teil; Bernard Lelong, Montelimar, both of France

[73] Assignee: Lafarge, Paris, France

[21] Appl. No.: 895,763

[22] Filed: Apr. 12, 1978

[30] Foreign Application Priority Data

Apr. 29, 1977 [FR] France .............................. 77 12963

[51] Int. Cl.² ............................................. C04B 11/00
[52] U.S. Cl. ..................................................... 106/110
[58] Field of Search ............................... 106/110, 109

[56] References Cited

U.S. PATENT DOCUMENTS

| | | | |
|---|---|---|---|
| 3,827,897 | 8/1974 | Dumont | 106/110 |
| 3,945,841 | 3/1976 | Dumont | 106/110 |

*Primary Examiner*—James Poer
*Attorney, Agent, or Firm*—Burgess, Ryan and Wayne

[57] ABSTRACT

The object of the present invention is a plaster obtained from phosphogypsum and its process of obtention. The plaster according to the invention contains phosphatic impurities which are fundamentally in the form of brushite and monetite of the formula $CaHPO_4$, which corresponds in infra-red spectrometry to the appearance of a peak characteristic of this formula, said plaster having a normal setting time.

12 Claims, No Drawings

PLASTER OBTAINED FROM PHOSPHOGYPSUM AND ITS PROCESS OF OBTENTION

Numerous technical solutions have been proposed in order to use as plaster the phosphogypsum originating from the so-called wet process preparation of phosphoric acid by reacting natural calcium phosphates with sulphuric acid.

It is known that phosphogypsum, a by-product of the above process, contains impurities which vary in kind and quantity according to the nature of the phosphate and the conditions of the reaction used. A great number of these impurities have a harmful effect upon the quality of the plasters, respectively:

phosphoric anhydride ($P_2O_5$), which is in the form of non-reacted phosphate granules, of phosphoric acid wetting the gypsum crystals and of syncrystallized calcium phosphate, thus closely linked with the gypsum structure;

fluorine, present as such in the non-reacted ore, is also in the form of calcium fluoride, aluminofluoride and fluosilicate, (these compounds, depending upon their nature, can be occluded in the gypsum or in the form of individualized granules);

other impurities, such as iron, aluminum, bitumen residues, alkaline elements, (which confer undesirable characteristics on the phosphogypsum).

These impurities act mainly by modifying the crystalline habitus and the transformation kinetics of the calcium sulphate. The result is that the plasters prepared from this phosphogypsum exhibit very strong alterations in their hydration and setting processes as well as a marked reduction in mechanical performance. Moreover, the presence of organic compounds and ferric salts is often one of the causes of the ochre color of the plaster which is undesirable for most of its uses.

The conventional processes applied in order to use phosphogypsum in the form of plaster consist first of all in eliminating the impurities as much as possible. This elimination can take place at the level of crystallization of the gypsum itself, in the phosphoric acid manufacturing plant, by optimizing the reacting and filtration conditions. The proportion of non-reacted phosphatic ore and the quantity of phosphoric acid which wets the gypsum crystals can be reduced.

Furthermore, it is possible to reduce the amount of syncrystallized impurities in the gypsum, either by modifying the solubility equilibrium conditions of the various elements present, or by transforming the impurities by appropriately chosen adjuvants, in chemical combinations which do not give rise to syncrystallization.

However, the prior gypsum purification treatments, although very effective, do not completely eliminate all the impurities. The presence of residues of syncrystallized impurities, even in reduced quantities, produces difficulties at the level of the dehydration of phosphogypsum into plaster and, during subsequent use of the plaster, is sufficient to modify the crystallization, hydration and setting processes of the material, thus interfering with its implementing and its mechanical properties. For example, it is noted that the baking of the thus purified phosphogypsum, without any special preparations according to the usual dehydration processes of the plaster industry, such as fixed or rotative caldrons, indirectly heated rotative ovens or kilns, usually takes place in an acid environment, even when the raw material introduced into the baking installation was perfectly neutralized. This acidity, resulting from the demixing of the syncrystalized impurities during the dehydration, causes, at very low temperatures, in the range of 130° to 150° C., the release of corrosive gases and, especially, hydrofluoric acid resulting from the decomposition of $CaF_2$. When this drawback is palliated, for example by an excess of alkalinization of the raw material by means of lime or calcium carbonate, the fact remains that the final obtained product presents various unfavourable properties which prevent it from being used in certain applications and which do not allow it to be compared to natural plasters. Thus slightly acid plasters set relatively quickly and are advantageous in the prefabrication industry, but the rapidity of the crystallization engenders a finer porousness which is unfavourable to the drying process. A stronger neutralization causes an irregular setting and the final hydration of the product is usually incomplete. In any case, the crystalline habitus of the rehydrated product remains confused and entails a weakening of the mechanical properties of the masses of set plaster.

The object of the present invention is to obtain a high quality plaster, from phosphogypsum, which is equivalent to natural plasters.

The plaster according to the invention obtained from phosphogypsum is remarkable especially in that the phosphatic impurities which it contains are fundamentally in the form of monocalcium phosphates of the formula $CaHPO_4$, which corresponds in infra-red spectrometry to the appearence of a peak characteristic of this formula, and in that it exhibits a normal setting time and mechanical strengths comparable to those of natural plaster.

Indeed, a monocalcium phosphate and more particularly the dihydrated or brushite form of this phosphate can be identified, in the treated phosphogypsum, or while it is being treated, by an infra-red spectroscope, said phase being perfectly defined and characterized by a peak which is distinct from the semi-hydrate infra-red peaks.

Furthermore, it is known that the anhydrous form of the monocalcium phosphate or monetite, although it cannot be identified by infra-red rays, is very easily formed from brushite, when said brushite is submitted to an elevated $H_2O$ partial vapor pressure.

As will be seen hereunder, in order to obtain the plaster according to the invention, the phosphogypsum is submitted to a treatment which comprises the maintaining of a relatively important $H_2O$ partial vapor pressure.

Due to this fact, if the presence of brushite in the plaster according to the invention cannot be denied, since it is identified by the infra-red control, the presence of monetite is highly probable.

Moreover, it will be noted that the respective solubilities of the monetite and the brushite are very much inferior to that of the semi-hydrate $CaSO_4.\frac{1}{2}H_2O$ since the monetite is insoluble, the brushite's solubility is in the range of 0.02% at 24° C. whilst that of the plaster is about 0.3% at 20° C.

The invention provides furthermore a process for obtaining said plaster.

The process according to the invention is characterized in that the raw, or briefly washed, material is submitted to a thermal treatment in two phases:

a dehydration phase, lasting between about 30 and 90 mn, at a temperature between 110° and 150° C., and preferably between 120° and 135° C.; then a conditioning phase, which can last between 10 mn and a few hours, the temperature being maintained at a substantially constant level of between 130° and 180° C., preferably being comprised between 140° and 160° C., under a H$_2$O partial vapor pressure at least equal to 100 Torrs, lime being added during the course of this treatment. The lime is preferably added in the form of calcium oxide. However, the lime may be added in any other form such as Ca(OH)$_2$; CaCO$_3$; CaCl$_2$; Ca(NO$_3$)$_2$, 4H$_2$O.

According to one embodiment of the process according to the invention, the addition of lime takes place at the end of the first phase of the treatment, that is to say at the end of the dehydration phase.

In another embodiment of the invention, this first dehydration phase of the thermal treatment also takes place under a H$_2$O partial vapor pressure of at least 100 Torrs and the lime, preferably in the form of calcium oxide, being added at the beginning or during the course of this phase. The vapor pressure of H$_2$O in said first and second phases can be in the range of 400 to 500 Torrs, however an H$_2$O vapor pressure in the range of 100 to 250 is more generally used.

It is known that the impurities present in the phosphogypsum in the form of syncrystallized ions occupy sites which are dispersed in the calcium sulphate crystal lattice.

It will be noted that when the phosphogypsum is baked under a H$_2$O partial vapor pressure higher than 100 torrs and in the presence of lime, a demixing of these ions takes place during the dehydration treatment of the gypsum.

These ions are collected in the form of a phase distinct from the gypsum and clearly characterized: the brushite or hydrated monocalcium phosphate which can decompose in the presence of H$_2$O vapor into monetite (CaHPO$_4$).

The thus formed phases are inert bodies with respect to the water-calcium sulphate system, and consequently incapable of acting upon the setting, the hydration and the resistance acquisitions of the plasters which contain them. The rise in temperature and maintaining the appropriate temperatures for a sufficient length of time greatly promotes these various effects of demixing, ion migration and phase transformations. This effect applies especially, in the case of phosphogypsum, to the syncrystallized phosphatic impurities which are present in the initial lattice of the gypsum in the form of HPO$_4$— —ions.

The demixing of these ions thus transforms them into a characteristic and easily identifiable phase which, in this case, is the brushite or hydrated bi-calcium phosphate, CaHPO$_4$.2H$_2$O, then the dehydration of this compound into anhydrous bi-calcium phosphate or monetite CaHPO$_4$ is induced; this compound is only slightly soluble and its influence is negligible on the later behaviour of the gypsum.

Care must be taken in order to ensure that the instigated thermal effect is compatible with the normal dehydration process of the gypsum, which has to be transformed into hemi-hydrated calcium sulphate, the principal component of plasters, and in order to avoid the formation of hard-fired, or anhydrite or anhydrous calcium sulphate, phase which is far less active than that of the semi-hydrate.

Moreover, a relatively high vapor pressure, in the reaction zone, favors the dehydration of the calcium phosphates at low temperatures.

Various types of thermal treatments, defined by the value and length of the temperature levels and by the H$_2$O partial pressures, were studied, the first temperature level being between 125° and 145° C., and preferably between 130° and 135° C. The thermal exchanges were studied in such a way that the dehydration of the gypsum into hemi-hydrate was concluded in about 60 mn, thus allowing the later rise of the temperature level to values between 145° and 210° C., preferably between 150° and 170° C. Likewise, H$_2$O partial vapor pressures between 40 and 250 Torrs, were maintained during the first step or dehydration step, and during the second step or conditioning step the H$_2$O partial vapor pressures, were maintained between 70 and 300 Torrs.

When the properties of the plasters obtained during these tests are compared with those of a natural plaster with equivalent impurities, on the one hand, with that of the same phosphogypsum dehydrated in only one step, on the other hand, it is noted that the baking in successive temperature levels and in a controlled atmosphere of H$_2$O vapor gives rise to a definite improvement of the obtained product. However, these qualities are far from equal to those of the natural gypsum. A deeper physical examination shows that the syncrystallized impurities are not completely demixed, independent of the applied conditions of temperature, vapor pressure and length of treatment.

Furthermore, the thermodynamic equilibrium conditions and the calcium sulphate transformation kinetics, in the range of the used temperatures and pressures, are such that baking cannot take place without the formation of an anhydrite, which is far less active than the semihydrate and inert under normal drying and hydration conditions.

In order to overcome these drawbacks, the equilibrium of the solid solutions of phosphated impurities/gypsum was modified by addding, during the baking, an adjuvant capable of causing a far more complete demixing of the impurities; it was noted that lime, especially calcium oxide, added in small quantities during the baking, modifies the properties of the plaster in a surprising manner.

Indeed, when the lime is introduced into the baking zone, in the presence of H$_2$O vapor, and mixed with the plaster after the nearly total dehydration of the gypsum into hemi-hydrate, it is noted that the hard-fired or anhydrite formed during the first part of the baking, in accordance with the results of the first test cited hereinabove, disappears very quickly after adding the lime, whereas all the obtained practical, physical and mechanical properties of the obtained plaster are similar to those of the best natural plasters.

Tables 1 and 2 show examples of the types of baking references A to H

TABLE 1

| Types of baking | Ex. | RX beginning | RX 24H hydratation | Gypsum RX | 1st sample without gypsum | | Last sample | |
|---|---|---|---|---|---|---|---|---|
| 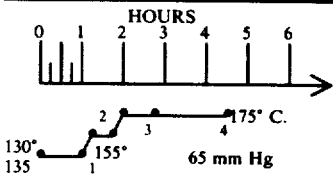 | A | Hard-fired: 1 to 4 | Hard-fired: on 4 shifted towards SH 25,7 | Nothing 1 to 4 | a 1 1h | Spreading 177 mm $BS_c$ 2'15 $ES_v$ 23'00 $S_c$ 18-20/46,5 / \ 2H 24H 2H dry | A 4 | Spreading 270 mm $BS_c$ 7'0 $ES_v$ 110' $S_c$ 16,5-21/43 |
| 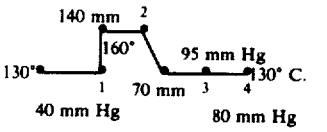 | B | Hard-fired: on 1 to 4 strong | Hard-fired: on more important 25,6 | 1 yes 2-2,4=0 | B 1 2h30 | 261 mm 5'15 35' 16-21/62 | B 4 | 275 mm 6' 45' 14,5-21/55,5 |
| 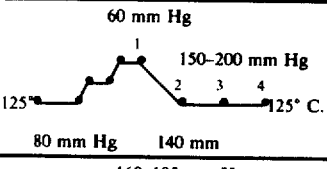 | C | Hard-fired: very important from the 1 > peak SH | Hard-fired: on 1 and 4 25,6 | 1 to 4 Nothing | C 1 2h15 | 165 mm 2'45 15' 20-26,5/61 | C 4 | 270 mm 4'45 29' 20,5-27/52,5 |
| 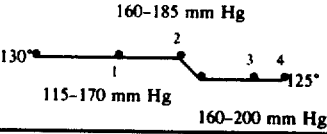 | E | Hard-fired: very important from the 1 > peak SH | Hard-fired: on 4 important 25,6 | 1 yes 2 traces 3-4 = nothing | F 3 5h | 168 mm 2' 12' 19-26,6/61 | E 4 | 187 mm 2' 12'30 19-26,3/59 |
| 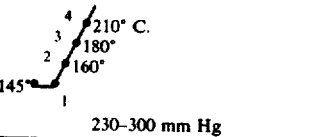 | F | Thus no hard-fired on 4 (2) | Hard-fired: ε on 3 2ε on 4 | 1 Very important 2 Import. 3-4 = nothing | F 3 1h | 228 mm 2'45 65' 16-18/42 | F 4 | 268 mm 7'30 130' 1,45-18/46 |
| 110° •——•——•——• 1 2 3  135 to 220 mm Hg | D | No hard-fired | | gypsum very important | | | | |

Phosphogypsum quality: CERPHOS washed and neutralized by $CaCO_3$
(*)BS = Beginning of blade setting.
ES = End of Vicat setting.
$S_c$ = Compression strength.
E/P = 0,8

TABLE 2

| Ex. | RX beginning | RX 24H hydratation | Gypsum RX | 1st sample without gypsum | Last Sample |
|---|---|---|---|---|---|
| G | no hard-fired from 1 to 3 | 1 SH shifted (+) i=4, i=15, i=26 (2 id., 3 id.) | Nothing from 1 to 3  G 1  1h15 | Spreading 243 mm  $BS_c$ 7'30  $ES_v$ 41'  $S_c$ 30-32/115  2H 24H dry  G 3 | 240 mm  7'  47'  19-30/78 |
| H | No hard-fired from 1 to 3 | 1 SH shifted i=7, i=17, i=20 (2 id., 3 id.) | nothing from 1 to 3  H 1 | 248 mm  5'30  30'  21-29/91  H 3 | 246 mm  7'45  56'  14-19/59 |
| J=E | | | | | |
| K | no hard-fired from 1 to 3 | 1 SH shifted i=3, i=4, i=3 | nothing from 1 to 3  K 1 | 237 mm  4'30  26'  24H dry  30-41/104  K 3 | 247 mm  5'45  36'  24H dry  32-43/104 |

Types of Baking

Baking with calcium oxide:

Example G: 170° C. / 160° / 150° / 140° with pressures: 200 mm Hg (0), 150 mm Hg (1), 150 mm Hg (2), 150 mm Hg (3); points 200, 155, 160, 170 over 2 HOURS

Example H: 180° / 170° / 160° / 150° / 140° / 135°; pressures: 200 mm Hg (0), 130 mm Hg (2), 118 mm Hg (3); points 135, 145, 160, 165, 180 over 2 HOURS

Example J=E / K: 150° / 140° / 135°; 180 mm Hg (3); points 250, 280, 300, 230 over 2 HOURS

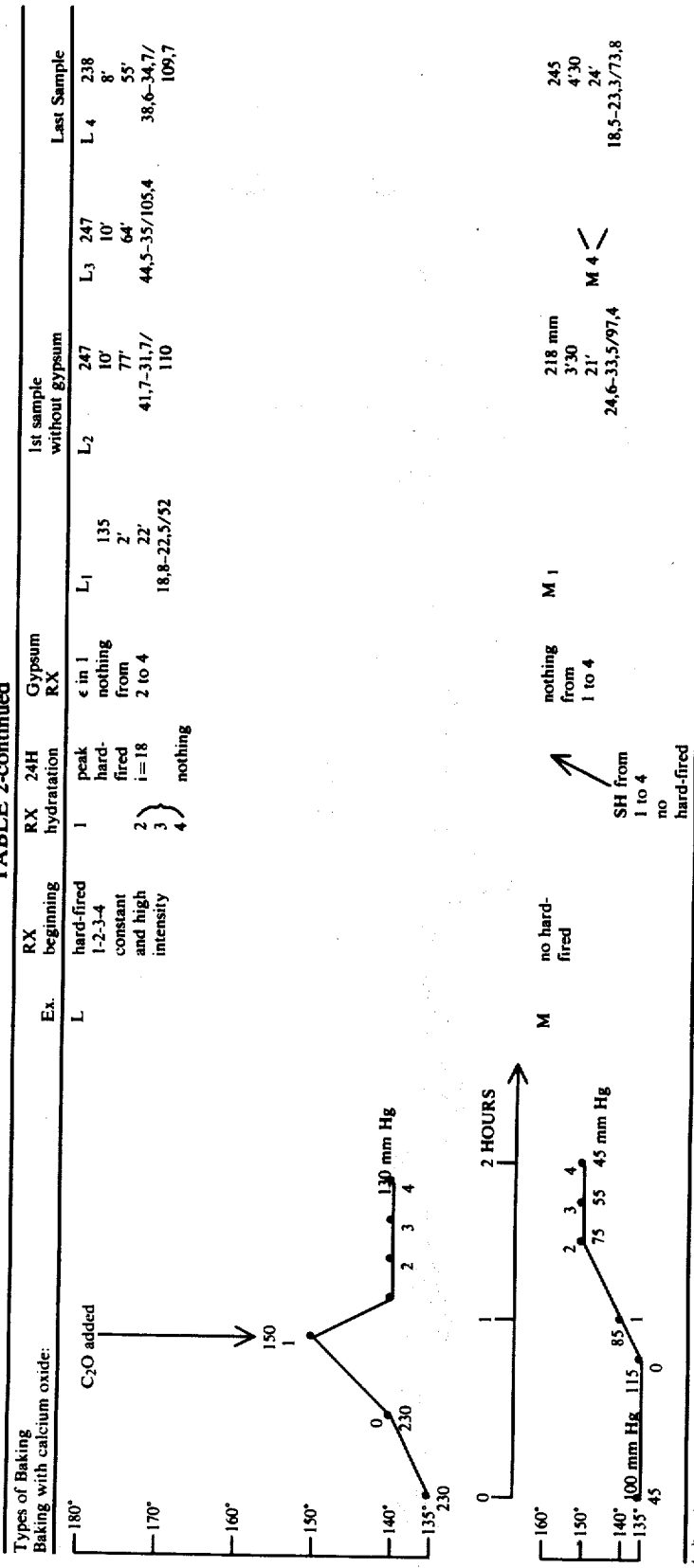

and K to M, with or without the addition of lime. The phosphogypsum used is as indicated.

No lime was added in the Examples A to H; the influence of the H₂O vapor is noted in Example E.

In Examples K to M, lime was added, with or without water, at various times during the treatment.

In Example K, calcium oxide was added before baking.

In Example L, calcium oxide was added at the end of the baking.

In Example M, the baking is carried out in the presence of calcium oxide, without the addition of water other than that produced by dehydration.

It was noted that the lime only reacted favourably when a certain H₂O partial vapor pressure was maintained in the baking zone.

The best results were obtained by dehydrating the gypsum at temperatures comprised between 130° and 150° C., the total duration of heating and dehydration was comprised between 30 and 90 mn. The lime was then added in quantities calculated to completely saturate the syncrystallized impurities in the gypsum; then the mixture was conditioned at temperatures comprised between 140° and 160° C. under H₂O partial vapor pressures at least equal to 100 Torrs and lasting between 10 mn and several hours.

This conditioning operation can take place either in the baking zone itself, or allowed to rest in a separate zone. Strictly speaking, although a high H₂O partial vapor pressure is only obligatory during the conditioning step, it can be advantageous to maintain it throughout the whole treatment encompassing the two baking and conditioning steps.

The thermal treatment process, according to the present invention, applies to any phosphogypsum containing syncrystallized impurities, the dehydration process of which, according to the usual processes of baking plaster, leads to unreliable products and mediocre mechanical properties, even after preliminary purification.

A preliminary purification of the raw phosphogypsum is not obligatory when carrying out the process according to the invention. It is, however, preferable to remove the organic impurities and the wetting phosphoric acid. Generally speaking, these washing and flotation operations are relatively simple and in the present case they do not have to be carried out very thoroughly.

Table 3 gives the properties of the plaster samples obtained according to the types of baking of Examples K, L and M, with the addition of lime, and without the addition of lime as in Example E but in the presence of H₂O vapor.

The comparison of the properties of samples $L_0$ and $L_1$ shows the influence of the H₂O vapor and lime on the reactivity of the hard-fired.

The lime may be added in the form of $Ca(OH)_2$; $CaCO_3$; $CaCl_2$; or $Ca(NO_3)_2, 4H_2O$. Table 4 hereunder gives the results of the differential thermal analysis (D.T.A.) and of the infra-red spectrometry when the addition is constituted by one of the compounds cited herein-below (Examples P to S). In Example O CaO is added while Example N is a control test, no lime being added.

In the D.T.A. it is noted that the peak of the hard-fired shifts towards low temperatures which is apparently an indication of demixion although this is not proven. It must be noted that the peak of the hard-fired obtained from natural gypsum is in the range of 350°–370° C.

The results given in this table indicate that the order of effectiveness appears to be as follows:

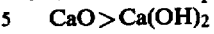

$CaO > Ca(OH)_2$

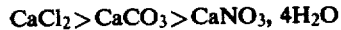

$CaCl_2 > CaCO_3 > CaNO_3, 4H_2O$

TABLE 3

| Baking | Mixing | Spreading (mm) | Blade setting | Beginning of Gilmore setting | End of Vicat setting | (+)$S_F/S_c$ 2H | $S_F/S_c$ 2H dry or 24H dry | $S_F/S_c$ 24H | RX diffraction at 24H |
|---|---|---|---|---|---|---|---|---|---|
| K | 0,8 | 247 | 5'45 | 17' | 36' | 14,6/31,9 | 29,10/103,6 | 15,15/43,00 | — |
| $L_0$ | 0,8 | 135 | 2' | 6'45 | 22' | 9,9/18,8 | 16,50/51,7 | 10,60/22,50 | hard-fired |
| $L_1$ | 0,8 | 247 | 10' | 23' | 77' | 16,9/41,7 | 38,00/110,0 | 11,60/31,70 | — |
| E | 0,8 | 187 | 2' | 7' | 12'30 | 11,4/18,9 | 18,15/59,20 | 13,25/26,30 | hard-fired |
| M | 0,8 | 248 | 4'30 | 11' | 24' | 12,1/20 | 22,40/77,00 | 12,50/23,00 | — |

(+)$S_F$ = Flexural strength.
$S_c$ = Compressive strength.

TABLE 4

| | | D.T.A. | Infra-red spectrometry | |
|---|---|---|---|---|
| Ex. | | Position of the peak of the hard-fired. | Syncrystallized HPO₄ ions. | Peak of demixing |
| N | Control without lime. | 470° C. | yes | no |
| O | 0.8% CaO | 380° C. | nearly complete disappearance | yes strong |
| P | 1% Ca(OH)₂ | 400° C. | nearly complete disappearance | yes strong |
| R | 1% of CaO in the form of CaCl₂ | 400° C. | complete disappearance | yes strong |
| R | 2% CaCO₃ | 410° C. | nearly complete disappearance | (1) |
| S | 1% of CaO in the form of Ca(NO₃)₂,4H₂O | 440° C. | diminished but not completely disappeared | appearance of a peak of average |

TABLE 4-continued

| | D.T.A. | Infra-red spectrometry | |
|---|---|---|---|
| Ex. | Position of the peak of the hard-fired. | Syncrystallized $HPO_4$ ions. | Peak of demixing |
| | | | demixing |

(1)The interferences of the carbonate peaks with the peaks of the demixing phases does not allow definite results.

Naturally the invention is not limited to the embodiments shown and described herein above. Many modifications may be made by those skilled in the art without departing from the spirit and scope of the invention as defined in the appended claims.

What is claimed is:

1. A process for preparing plaster from phosphogypsum which comprises: contacting the phosphogypsum with from about 0.8 to 4.0% of a calcium source to react with the syncrystalline impurities in the phosphogypsum during a heat treatment which comprises:
   (a) dehydrating the phosphogypsum by heating at a temperature of from 110° C. to 150° C. for from about 30 to 90 minutes and
   (b) conditioning the phosphogypsum product of step (a) by heating at 130° C. to 180° C. for at least 10 minutes under a $H_2O$ partial pressure of at least 100 Torrs.

2. A process according to claim 1, wherein the dehydration is carried out at a temperature between 120° and 135° C.

3. A process according to claim 1, wherein the conditioning is carried out at a temperature between 140° and 160° C.

4. A process according to claim 1, wherein the calcium source is added at the end of the dehydration.

5. A process according to claim 1, wherein the calcium source is CaO.

6. A process according to claim 1, wherein the calcium source is $Ca(OH)_2$.

7. A process according to claim 1, wherein the calcium source is $CaCl_2$.

8. A process according to claim 1, wherein the calcium source is $Ca(NO_3)_2 \cdot 4H_2O$.

9. A process according to claim 1, wherein calcium oxide is present in the mixture during the dehydration, the dehydration being carried out under a $H_2O$ partial vapor pressure at least equal to 100 Torrs.

10. A process according to claim 1, wherein the dehydration and conditioning are carried out under a $H_2O$ partial vapor pressure in the range of 400 to 500 Torrs.

11. A process according to claim 1, wherein the dehydration and conditioning are carried out under a $H_2O$ partial vapor pressure in the range of 100 to 250 Torrs.

12. A plaster obtained according to claim 1.

* * * * *